Patented July 2, 1946

2,403,370

UNITED STATES PATENT OFFICE 2,403,370

ALKYLATION OF HALOGENOSILANES

Dallas T. Hurd, Schenectady, N. Y., assignor to General Electric Company, a corporation of New York No Drawing. Application March 15, 1945, Serial No. 582,999

14 Claims. (Cl. 260—607)

The present invention relates to the alkylation of halogenosilanes. It is specifically concerned with a method of increasing the alkyl content of halogenosilanes by substituting lower alkyl groups for at least some of the halogen atoms in a halogenosilane containing at least two silicon-bonded halogen atoms and at least one silicon-bonded monovalent hydrocarbon radical.

The invention has for its primary object the conversion of alkylhalogenosilanes to alkylhalogenosilanes of higher alkyl content. A further object of the invention is to provide a method whereby all or part of the silicon-bonded halogen atoms of an alkylhalogenosilane or mixture of alkylhalogenosilanes containing at least two silicon-bonded halogen atoms, particularly chlorine or bromine atoms, can be replaced by lower alkyl groups to form alkylhalogenosilanes or mixtures thereof having higher alkyl-to-silicon ratios.

Briefly described these objects and others which will become apparent hereinafter are attained in accordance with the present invention by bringing a gaseous mixture of a lower alkyl halide and an alkylhalogenosilane containing at least two halogen atoms connected to silicon into contact at an elevated temperature with a metal selected from the group consisting of aluminum and zinc. It has been found that under such conditions all or part of the halogen atoms of the halogenosilane are replaced by alkyl groups from the alkyl halide to form the more alkylated silanes. Concomitantly the metal, such as aluminum, is converted to its halide probably through the intermediate formation of a metalalkyl compound which reacts with the halogenosilane whereby the replacement of alkyl radicals for the silicon-bonded halogen atoms takes place.

In order that those skilled in the art better may understand how the present invention can be carried into effect the following illustrative examples are given:

Example 1

The mixed vapors of pure dimethyldichlorosilane (density=1.067) and methyl chloride in 1:1 ratio were passed into a vertical glass reaction tube charged with 20 mesh aluminum granules heated to 350° C. A small amount of hydrogen was added to the gas stream to sweep the products of the reaction out of the tube. A reaction occurred with the formation of aluminum chloride, which sublimed and was collected in a special trap fitted to the tube, and a liquid product that was condensed by a water-cooled condenser as it passed from the tube. This product had a density of 0.983 and exhibited the characteristic pungent odor associated with trimethylchlorosilane. Fractionation of the product showed it to be composed of approximately 30% trimethylchlorosilane, a trace of silicon tetramethyl, and 70% unreacted dimethyldichlorosilane.

Example 2

The mixed vapors of pure methyltrichlorosilane and methyl chloride in 1:1 ratio were passed over aluminum at 350° C. employing the same apparatus as that used in Example 1. Fractionation of the products of this reaction showed a composition of 6.3% trimethylchlorosilane, 4.5% dimethyldichlorosilane, the rest of the product being largely unreacted methyltrichlorosilane.

Example 3

Example 2 was repeated with the aluminum heated to a temperature of 450° C., a small amount of hydrogen being added to the gas stream to sweep the reaction products out of the hot tube. A fractionation of the condensate showed its composition to be: 21% trimethylchlorosilane, 11% dimethyldichlorosilane, 3–4% methyldichlorosilane, and the remainder largely unreacted methyltrichlorosilane.

Example 4

The vapors of pure dimethyldibromosilane and methyl bromide in 2:1 mol ratio were passed together over aluminum at 350° C. A reaction occurred with the formation of aluminum bromide and a liquid product which condensed in a water-cooled condenser. Fractionation of the liquid product yielded a quantity of trimethylbromosilane boiling between 80–81° C.

Example 5

The mixed vapors of pure dimethyldichlorosilane (density=1.067) and ethyl chloride in 1:1 mol ratio were passed over aluminum at 350° C. The density of the condensed liquid product was 1.05. Distillation of this product yielded a small amount of material boiling at 88–92° which had the pungent odor characteristic of trialkylmonohalosilanes such as trimethylchlorosilane and trimethylbromosilane and which was identified as consisting mainly of dimethylethylchlorosilane.

Example 6

The mixed vapors of pure dimethyldichlorosilane and methyl chloride in a 1:1 mol ratio were passed over 80 mesh granular zinc at 375° C. in apparatus similar to that employed in Example 1. A reaction ensued, considerable amounts of zinc chloride were formed, and a liquid product was condensed at room temperature. The product contained 47.23% chlorine indicating a composition of about 30% trimethylchlorosilane and 70% unchanged dimethyldichlorosilane. Distillation of the sample established the presence of a substantial amount of trimethylchlorosilane.

While for the purpose of illustration, the above examples have been limited to the reaction of pure mono- or di-alkylhalogenosilanes, it is obvious that the invention is also applicable to the alkylation of mixtures of these two types of alkyl halogenosilanes, which mixtures may include other halogenosilanes such as tri-alkyl derivatives, silicon tetrahalides, etc. For example, a mixture of methyltrichlorosilane and dimethyldichlorosilane in any proportions may be reacted with methyl chloride or methyl bromide to form products correspondingly richer in the dimethyl derivatives and containing substantial quantities of trimethyl derivatives as well as possible traces of the tetramethyl silane. The invention may also be employed in the treatment of more complex halogenosilane mixtures resulting, for example, from the reaction of an alkyl halide with silicon in accordance with the process described and claimed in application Serial No. 412,459, filed September 26, 1941, in the name of Eugene G. Rochow, now Patent No. 2,380,995, issued August 7, 1945, and assigned to the same assignee as the present invention. Such mixtures will ordinarily contain all three possible alkylhalogenosilanes along with substantial amounts of tetrahalide and some unreacted alkyl halide. The mixed reaction products usually contain more halogen than alkyl groups due to the presence of proportionally larger quantities of the mono-alkyltrihalogenosilane. By passing these mixed products directly over aluminum or other suitable metal in accordance with the present invention, with or without additional alkyl halide, it is possible to increase the overall alkyl content of the mixture and to obtain proportionally larger quantities of the more highly alkylated silanes.

Mixtures of halogenosilanes of increased alkylation can also be obtained from the process described in the above-mentioned Rochow application by introducing aluminum or zinc directly into the reaction vessel along with the silicon reactant employed in the Rochow process. This method of increasing the overall alkylation of a mixture of monohydrocarbon-substituted halogenosilanes is described and claimed in my copending application Serial No. 582,997, filed concurrently herewith, and assigned to the same assignee as this present invention.

At the temperatures usually employed in the alkylation of the alkylhalogenosilanes in accordance with the present invention, little reaction appears to take place between silicon tetrachloride and an alkyl halide such as methyl chloride. At more elevated temperatures a reaction does take place between these two materials with the formation of very small amounts of methylchlorosilanes. In the treatment of the mixed products obtained from the Rochow process, the silicon tetrahalide will have little if any effect on the nature of substitution products obtained therefrom.

It will be understood, of course, that the invention is not limited to the alkylation of the specific halogenosilanes named in the above examples, and that any halogenosilane containing at least two halogen atoms, specifically bromine or chlorine atoms, attached to silicon and at least one silicon-bonded lower monovalent hydrocarbon radical such as a methyl, ethyl, or phenyl radical may be reacted with a lower alkyl (methyl, ethyl, etc.) chloride or bromide for the purpose of substituting such lower alkyl radicals for the silicon-bonded halogen atoms. Best overall results appear to be obtained with the methyl halides.

Likewise, the invention is not limited to the specific temperature ranges given in the examples. However, the reaction temperatures should not be so high as to cause excessive decomposition of the halogenosilanes. In general, the preferred reaction temperatures to be used will depend on the particular halogenosilane, the particular hydrocarbon halide and the yields of the specific reaction products desired. Usually reaction temperatures will range between 300 and 500° C., although in certain cases acceptable yields of the desired products may be obtained at lower reaction temperatures of the order of 250° C.

What I claim as new and desire to secure by Letters Patent of the United States is:

1. The method of substituting low alkyl radicals for at least some of the halogen atoms in a halogenosilane containing at least two silicon-bonded halogen atoms and at least one silicon-bonded monovalent hydrocarbon radical which comprises bringing a mixture comprising said halogenosilane and a lower alkyl halide into contact at an elevated temperature with a metal selected from the class consisting of aluminum and zinc.

2. The method of preparing an alkylhalogenosilane containing at least two silicon-bonded alkyl radicals from an alkylhalogenosilane containing a lesser number of silicon-bonded alkyl groups which comprises bringing a mixture of an alkylhalogenosilane of the latter type and a lower alkyl halide into contact at an elevated temperature with a metal selected from the class consisting of aluminum and zinc.

3. The method of substituting a lower alkyl radical for at least some of the halogen atoms in a methyl-halogenosilane containing at least two silicon-bonded halogen atoms which comprises bringing a mixture of said methylhalogenosilane and a lower alkyl halide into contact at an elevated temperature with a metal selected from the class consisting of aluminum and zinc.

4. The method of preparing an alkylhalogenosilane containing at least two silicon-bonded alkyl radicals from an alkylhalogenosilane containing a lesser number of silicon-bonded alkyl groups which comprises bringing a gaseous mixture comprising an alkylhalogenosilane of the latter type and a lower alkyl halide into contact at an elevated temperature with a metal selected from the class consisting of aluminum and zinc.

5. The method of preparing a dialkyldihalogenosilane which comprises bringing a mixture of a monoalkyltrihalogenosilane and a lower alkyl halide into contact at an elevated temperature with a metal selected from the class consisting of aluminum and zinc.

6. The method of preparing a dimethyldihalogenosilane which comprises bringing a mixture of a monomethyltrihalogenosilane and a methyl halide into contact at an elevated temperature with a metal selected from the class consisting of aluminum and zinc.

7. The method of preparing a trialkylhalogenosilane which comprises effecting reaction between (1) an alkylhalogenosilane containing at least two silicon-bonded halogen atoms and not more than two silicon-bonded alkyl radicals, (2) a lower alkyl halide and (3) a metal selected from the class consisting of aluminum and zinc.

8. The method of preparing a trimethylhalogenosilane which comprises effecting reaction between (1) a methylhalogenosilane containing at least two silicon-bonded halogen atoms and not more than two silicon-bonded methyl radicals, (2) a methyl halide and (3) a metal selected from the class consisting of aluminum and zinc.

9. The method of substituting methyl radicals for at least some of the chlorine atoms in a methylchlorosilane containing at least two silicon-bonded chlorine atoms and at least one methyl group which comprises bringing a mixture comprising said methylchlorosilane and a methyl halide into contact at an elevated temperature with a metal selected from the class consisting of aluminum and zinc.

10. The method of converting methyltrichlorosilane to methylchlorosilanes containing more than one methyl radical which comprises passing a mixture of methyltrichlorosilane and methyl chloride over a metal selected from the class consisting of granular aluminum and zinc at a temperature of from about 300° C. to 500° C.

11. The method of converting dimethyldichlorosilane to trimethylchlorosilane which comprises passing a mixture of dimethyldichlorosilane and methyl chloride over a metal selected from the class consisting of granular aluminum and zinc at a temperature of from about 300° C. to 500° C.

12. The method of converting methyltrichlorosilane to methylchlorosilanes containing more than one methyl radical which comprises passing a mixture of methyltrichlorosilane and methyl chloride over granular zinc at a temperature of from about 300° C. to 500° C.

13. The method of converting dimethyldichlorosilane to trimethylchlorosilane which comprises passing a mixture thereof with methyl chloride over granular zinc at a temperature of from about 300° C. to 500° C.

14. The method of converting dimethyldichlorosilane to a trialkylchlorosilane which comprises passing a mixture thereof with ethyl chloride over granular aluminum at a temperature of from about 300° C. to 500° C.

DALLAS T. HURD.